US008922872B2

(12) United States Patent
Chen et al.

(10) Patent No.: US 8,922,872 B2
(45) Date of Patent: Dec. 30, 2014

(54) SPD FILMS WITH DARKER OFF-STATE TRANSMITTANCES AND LIGHTER ON-STATE TRANSMITTANCES

(71) Applicant: Research Frontiers Incorporated, Woodbury, NY (US)

(72) Inventors: Xiao-Ping Chen, East Meadow, NY (US); Steven M. Slovak, N. Massapequa, NY (US); Seth Van Voorhees, Short Hills, NJ (US)

(73) Assignee: Research Frontiers Incorporated, Woodbury, NY (US)

( * ) Notice: Subject to any disclaimer, the term of this patent is extended or adjusted under 35 U.S.C. 154(b) by 0 days.

(21) Appl. No.: 13/761,577

(22) Filed: Feb. 7, 2013

(65) Prior Publication Data
US 2013/0208342 A1 Aug. 15, 2013

Related U.S. Application Data

(60) Provisional application No. 61/597,596, filed on Feb. 10, 2012.

(51) Int. Cl.
G02B 26/00 (2006.01)
G02F 1/17 (2006.01)
(52) U.S. Cl.
CPC . *G02F 1/17* (2013.01); *G02F 1/172* (2013.01)
USPC ........................................................ 359/296
(58) Field of Classification Search
CPC ..... G02F 1/172; B32B 17/06; C08L 2666/01; C08L 53/00; C08L 67/028
USPC .......................... 359/296, 253, 241; 345/107; 252/582–584, 588
See application file for complete search history.

(56) References Cited

U.S. PATENT DOCUMENTS

| | | | |
|---|---|---|---|
| 4,247,175 A | 1/1981 | Saxe | |
| 4,407,565 A | 10/1983 | Saxe | |
| 4,464,019 A | 8/1984 | Gagnon | |
| 4,772,103 A | 9/1988 | Saxe | |
| 5,300,942 A | 4/1994 | Dolgoff | |
| 5,409,734 A | 4/1995 | Lee et al. | |
| 5,461,506 A | 10/1995 | Check, III et al. | |
| 5,463,491 A | 10/1995 | Check, III | |
| 5,463,492 A | 10/1995 | Check, III | |
| 5,563,727 A | 10/1996 | Larson et al. | |
| 5,728,251 A | 3/1998 | Check, III | |
| 6,301,040 B1 | 10/2001 | Chakrapani et al. | |
| 6,416,827 B1 | 7/2002 | Chakrapani et al. | |
| 6,900,923 B2 | 5/2005 | Chakrapani et al. | |
| 6,936,193 B2 | 8/2005 | Saxe et al. | |
| 7,361,252 B2 | 4/2008 | Slovak et al. | |
| 2005/0153772 A1 | 7/2005 | Griswold et al. | |
| 2010/0047593 A1 | 2/2010 | Higashida et al. | |
| 2010/0315693 A1 | 12/2010 | Lam et al. | |

OTHER PUBLICATIONS

International Search Report mailed Apr. 17, 2013 in corresponding International Application No. PCT/US13/25113.
Written Opinion of the International Searching Authority mailed Apr. 17, 2013 in corresponding International Application No. PCT/US13/25113.

*Primary Examiner* — Tuyen Tra
(74) *Attorney, Agent, or Firm* — Ostrolenk Faber LLP

(57) ABSTRACT

A light valve film forming a light-modulating element of a light valve, the film comprised of a cross-linked polymer matrix with a plurality of droplets of a liquid light valve suspension distributed therein. The film has a phase ratio: % particle number value calculated by the formula:

$$\frac{\text{Matrix/capsule ratio}}{\text{\% particles in the capsule}} = \text{Phase ratio: \% particle number}$$

In one embodiment the light valve film has a relatively low visible transmittance in the unpowered Off state such that the film has a % T of <0.05 and a ΔT of >42%. In another embodiment the light valve film has a relatively high visible transmittance in the On state such that the film has a % T of >70% and a ΔT of >57%.

8 Claims, No Drawings

SPD FILMS WITH DARKER OFF-STATE TRANSMITTANCES AND LIGHTER ON-STATE TRANSMITTANCES

RELATED APPLICATION

This application is based on and claims priority to U.S. Provisional Patent Application Ser. No. 61/597,596 filed on Feb. 10, 2012 and entitled "SPD FILMS WITH DARKER OFF-STATE TRANSMITTANCES AND LIGHTER ON-STATE TRANSMITTANCES," the entire contents of which are hereby incorporated by reference.

FIELD OF THE INVENTION

The invention is directed to films and laminations of films for use in light valves which comprise liquid particle suspensions and emulsions thereof, which light valves are generally referred to herein as suspended particle devices or SPD light valves, or simply as SPDs. The SPD films were formed from emulsions (sometimes called SPD emulsions) that were formulated to yield SPD films with very dark off-state transmittances. Other SPD emulsions were formulated to yield SPD films with very high on-state transmittances.

GENERAL BACKGROUND

SPD light valves have been known for more than seventy years for use in the modulation of light. Such light valves have been proposed for use in numerous applications during that time including, e.g., alphanumeric displays and television displays; filters for lamps, cameras, displays and optical fibers; and windows, sunroofs, toys, sunvisors, eyeglasses, goggles, mirrors, light pipes and the like to control the amount of light passing therethrough or reflected therefrom as the case may be. Examples of windows include, without limitation, architectural windows for commercial buildings, greenhouses and residences, windows, visors and sunroofs for automotive vehicles, boats, trains, planes and spacecraft, windows for doors including peepholes, and windows for appliances such as ovens and refrigerators including compartments thereof. Light valves of the type described herein are also known, as indicated above, as suspended particle devices or SPDs.

As used herein, the term "light valve" describes a cell formed of two walls that are spaced apart by a small distance, with at least one wall being transparent. The walls have electrodes thereon, usually in the form of transparent, electrically conductive coatings. The coatings are commonly, but not necessarily, formed of indium tin oxide. The electrically conductive coatings can be deposited on the walls in patterns so that different segments of the light valve can be selectively activated. Additionally the electrodes on the walls may have thin transparent dielectric overcoatings thereon. The cell contains a light-modulating element (sometimes herein referred to as an activatable material) which may, without limitation, be either a liquid suspension of particles, or all or a portion of the entire element may comprise a plastic film in which droplets of a liquid suspension of particles are distributed.

The liquid suspension (sometimes herein referred to as a liquid light valve suspension or as a light valve suspension) comprises small particles suspended in a liquid suspending medium. In the absence of an applied electrical field, the particles in the liquid suspension assume random positions due to Brownian movement. Hence, a beam of light passing into the cell is reflected, transmitted or absorbed depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. The $\Delta T$ is defined as the difference in visible light transmission between the ON and OFF states.

For many applications it is preferable for all or part of the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of light suspension, can be avoided through use of a film and the risk of possible leakage can also be avoided. Another advantage of using a plastic film is that, in a plastic film, the particles are generally present only within very small droplets and, hence, do not noticeably agglomerate when the film is repeatedly activated with a voltage.

A light valve film (also sometimes herein referred to as an SPD film) as used herein means a film or sheet, or more than one thereof comprising a suspension of particles used or intended for use in an SPD light valve. Such light valve film usually comprises a discontinuous droplet phase of a liquid or liquids comprising dispersed particles (liquid light valve suspension), such discontinuous phase being dispersed throughout a solid continuous matrix phase, said phases enclosed within one or more rigid or flexible solid films or sheets. The combined aforesaid phases are referred to as the cured SPD emulsion, which may be part of a light valve film, sometimes also referred to as a film or film layer. The light valve film and/or laminate of the light valve film may also comprise one or more additional layers such as, without limitation, a film, coating or sheet or combination thereof, which may provide the light valve film with one or more of, for example, (1) scratch resistance, (2) protection from ultraviolet radiation, (3) reflection of infrared energy, (4) electrical conductivity for transmitting an applied electric or magnetic field to the activatable material, (5) dielectric overcoatings, i.e., for providing insulation protection against short circuits, (6) color tinting and (7) acoustic control.

A common (but non-limiting) construction for an SPD film has five layers, namely, from one side to the other: (1) a first sheet of polyethylene terephthalate ("PET") plastic, conveniently 5-7 mils in thickness, (2) a very thin transparent, electrically conductive coating (typically of indium tin oxide ("ITO")), acting or capable of acting as an electrode, on said first sheet of PET, (3) a layer of cured (i.e., cross-linked) SPD emulsion, usually 2-5 mils in thickness and, (4) a second coating (typically ITO) acting or capable of acting as an electrode on (5) a second PET plastic substrate. As stated previously, additional layers which provide other functions may optionally be added to the five-layer SPD film described above. Typically, copper foil, conductive fabric or the like are affixed to the electrodes so that they extend beyond the perimeter of the SPD film for convenient connection to a suitable voltage source. Furthermore, the SPD film can be laminated (see U.S. Pat. No. 7,361,252 assigned to the assignee of the present invention), for example, between transparent hot melt adhesive films and/or glass or thicker transparent plastic sheets to provide strength and rigidity and to protect various parts of the combined unit from environmental stresses which may, otherwise, damage its performance characteristics.

Electric power to actuate the light valve and film can be from any conventional or non-conventional source. For example, the assignee of the present invention has publicly demonstrated operation of an SPD film and light valve powered by photoelectric/photovoltaic energy that may be derived from solar energy or an alternative light source such as a lamp.

U.S. Pat. No. 5,409,734 exemplifies a type of non-cross-linked light valve film that is made by phase separation from a homogeneous solution. Light valve films made by cross-linking (curing) of emulsions are also known. The methods of the present invention are specifically directed to the use of the latter type of film, i.e., film comprising a layer formed by cross-linking an emulsion, and to laminated films produced thereby. See, for example, U.S. Pat. Nos. 5,463,491 and 5,463,492, and U.S. Pat. No. 7,361,252, all of which are assigned to the assignee of the present invention. Various types of SPD emulsions, and methods of curing same, are described in U.S. Pat. Nos. 6,301,040, 6,416,827, and 6,900,923 B2, all of which are assigned to the assignee of the present invention. Such films and variations thereof may be cured through cross-linking brought about by exposing the films to (1) ultraviolet radiation, (2) electron beams or (3) heat. All of the patents and patent applications and other references cited in this application are incorporated herein by reference.

A variety of liquid light valve suspensions are well known in the art and such suspensions are readily formulated according to techniques well-known to one of ordinary skill therein. The term liquid light valve suspension, as noted above, when used herein means a liquid suspending medium in which a plurality of small particles are dispersed. The liquid suspending medium comprises one or more non-aqueous, electrically resistive liquids in which there is preferably dissolved at least one type of polymeric stabilizer that acts to reduce the tendency of the particles to agglomerate and to keep them dispersed and in suspension.

Liquid light valve suspensions useful in the present invention may include any of the so-called prior art liquid suspending media previously proposed for use in light valves for suspending the particles. Liquid suspending media known in the art which are useful herein include, but are not limited to, the liquid suspending media disclosed in U.S. Pat. Nos. 4,247,175, 4,407,565, 4,772,103, 5,409,734, 5,461,506, 5,463,492, and 6,936,193 B2, the disclosures of which are incorporated herein by reference. In general one or both of the suspending medium or the polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid(s) which comprise the liquid suspending medium. Alternatively, there may be two or more solid polymeric stabilizers serving as a polymeric stabilizer system. For example, the particles can be coated with a first type of solid polymeric stabilizer such as nitrocellulose which, in effect, when dissolved, provides a plain surface coating for the particles, together with one or more additional types of solid polymeric stabilizer that when dissolved, bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described for example in U.S. Pat. No. 5,463,492.

Inorganic and organic particles may be used in a light valve suspension, and such particles may be either light absorbing or light reflecting in the visible portion of the electromagnetic spectrum.

Conventional SPD light valves have generally employed particles of colloidal size. As used herein the term colloidal means that the particles generally have a largest dimension averaging 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms, to keep light scatter extremely low.

BACKGROUND OF INVENTION

Prior art SPD films have limitations in achieving significant ranges in light transmission between their OFF (unpowered) state and their ON (powered) state when an electrical field is applied. This phenomenon is particularly evident when the OFF state is very dark (<0.5% transmittance) or the ON state is very light (>70% transmittance). Lavatory and conference room windows and doors are non-limiting examples of applications where a very dark OFF state SPD film is desired for complete privacy. A very light ON state SPD film, >70% transmittance, is required for certain windows in motor vehicles due to safety regulations and desirable for eyewear utilizing SPD technology. This invention exceeds the above transmittance values and, at the same time, yields significantly higher ranges of light transmission, $\Delta T$'s than prior art SPD films.

DEFICIENCIES OF PRIOR ART SPD FILMS AND SPD LAMINATES

As mentioned above, prior art SPD films have suffered from reduced ranges of light transmission when attempts were made to either prepare an SPD film with a relatively dark OFF state or prepare an SPD film with a relatively light ON state. Example 6 of U.S. Pat. No. 5,463,492, assigned to the assignee of the present invention, describes the preparation of an SPD film with an OFF state transmission of 0.42%. However, no corresponding ON state transmission was disclosed. Example 11 of U.S. Pat. No. 5,463,492 describes the preparation of an SPD film with a transmission range of 45% OFF to 72% ON. The high 72% ON state transmittance is achieved but at the expense of a narrow $\Delta T$ of 27 and a very light OFF state transmittance of 45%. Another deficiency of the prior art SPD film examples of U.S. Pat. No. 5,463,492 was the requirement that the SPD films be swollen with an organic liquid to achieve the ON state transmittance.

Table 3 of U.S. Pat. No. 7,847,033, assigned to the assignee of the present invention, lists SPD films with ON state transmittances >70%. However, the OFF state transmittances of the SPD films in Table 3 are still relatively light (approximately 25% transmittance).

A standard procedure to produce a darker OFF state transmittance of an SPD film is to increase the thickness of the SPD emulsion to yield a respectively darker transmittance SPD film. Similarly, a standard procedure to produce a lighter ON state transmittance of an SPD film is to decrease the thickness of the SPD emulsion to yield a respectively lighter transmittance SPD film. This method to change the transmittance of an SPD film creates significant technical difficulties. For example, a thinner emulsion layer will lead to cured SPD film that has lower cohesion. The required subsequent handling steps of said film that include busbar application and lamination of the SPD film between glass or plastic substrates at elevated temperatures and pressure can cause the thinner SPD film to tear and create a short-circuit or be otherwise rendered unusable. In addition, reducing the thickness of the SPD emulsion layer too close to the limit of the accuracy of the coating applicator can lead to uneven SPD films that have a blotchy appearance.

A thicker emulsion may cause incomplete curing issues that limit product performance. In addition, a thicker emulsion layer will also lead to cured SPD film that requires significantly higher voltages to fully align the particles within the droplet phase of the SPD film. These higher voltages may: (i) require higher than standard voltages found in residential and commercial locations, (ii) cause product safety issues requiring additional safety components, and (iii) will cause the SPD film to consume more power which will reduce the energy efficiency of products made from the thicker SPD film.

Another route to darker SPD films is to simply stack two SPD light valves so that the incident light is required to pass through two layers of SPD film. However, this method will require twice the materials including conductive-coated PET and busbars, as well as, an additional interlayer sheet for the lamination process.

SUMMARY OF THE INVENTION

This invention enables the production of two novel SPD films. The first SPD film has a very dark, low visible transmittance in the OFF state (<0.5% T) and the second SPD film has a very light, high visible transmittance in the ON state (>70% T). Both of the novel SPD films maintain a significantly high ΔT. This is accomplished by the invention of new SPD emulsion formulations that include particularly effective ranges of particle loading %'s in the liquid suspending medium of the capsule phase of the emulsion (defined hereinafter) together with adjustments to the ratio of the continuous matrix phase and the discontinuous capsule phase of the emulsion.

In one embodiment the invention comprises a light valve film forming a light modulating element of a light valve, the film comprised of a cross-linked matrix polymer with a plurality of droplets of a liquid light valve suspension distributed therein, the film having a phase ratio: % particle number value >0.157 and <0.220, wherein the phase ratio: % particle number value is calculated using the following formula $$\frac{\text{Matrix/capsule ratio}}{\% \text{ particles in the capsule}} = \text{Phase ratio: \% particle number}$$

and wherein the light valve film has a relatively low visible transmittance in the unpowered Off state such that the film has a % T of <0.05 and a ΔT of >42%.

In an alternate embodiment, the invention comprises a light valve film forming a light modulating element of a light valve, said film comprised of a cross-linked matrix polymer with a plurality of droplets of a liquid light valve suspension distributed therein, said film having a phase ratio: % particle number value >0.802 and <1.197, wherein the phase ratio: % particle number value is calculated using the following formula $$\frac{\text{Matrix/capsule ratio}}{\% \text{ particles in the capsule}} = \text{Phase ratio: \% particle number}$$

and wherein the light valve film has a relatively high visible transmittance in the On state such that the film has a % T of >70% and a ΔT of >57%.

In the case of either of the embodiments described above, the light valve film may further comprise, applied upon the film, at least one layer selected from among a film, a coating and a sheet, wherein the at least one layer provides to said film at least one selected from the group consisting of scratch resistance, protection from ultraviolet radiation, reflection from infrared energy, electrical conductivity for transmitting an applied electric or magnetic film to the light valve film, insulation protection from short circuits, color tinting and acoustic control.

In a still further embodiment the invention comprises an electro-optical device for controlling the transmission of radiation, said device having two opposed sides and comprising, from one side to the other:

(a) a first sheet of polyethylene terephthalate (PET) plastic;

(b) a first thin, transparent electrically conductive coating that acts, or is capable of acting as an electrode, on the first sheet of PET:

(c) a first light valve film having either: (1) a relatively low visible transmittance in the unpowered Off state such that the film has a % T of <0.5 and a ΔT of >42% as described above, or (2) one having a relatively high visible transmittance in the On state such that the film has a % T of >70% and a ΔT of >57% as also described above;

(d) a second thin, transparent electrically conductive coating acting or capable of acting as an electrode, said second coating applied upon an outer surface of, (e) a second sheet of polyethylene terephthalate plastic;

(f) a third thin, transparent electrically conductive coating acting or capable of acting as an electrode, said third coating applied upon an inner surface of said second sheet of polyethylene terephthalate plastic, (g) a second light valve having either: (1) a relatively low visible transmittance in the unpowered Off state such that the film has a % T of <0.5 and a ΔT of >42% as described above, or (2) one having a relatively high visible transmittance in the On state such that the film has a % T of >70% and a ΔT of >57% as also described above;

(h) a fourth thin, electrically conductive coating acting or capable of acting as an electrode, said fourth coating applied upon an inner surface of, (i) a third sheet of polyethylene terephthalate (PET) plastic.

DETAILED DESCRIPTION OF THE INVENTION

The inventors have found that a combination of adjusting the particle % in the capsule phase of the SPD emulsion to specific ranges, coupled with controlling the ratio of the continuous matrix phase to the discontinuous capsule phase of the emulsion, yields both very dark SPD films in the unpowered off-state (<0.5% T) with a ΔT >42% and very light SPD films in the powered on-state (>70% T) with a ΔT >57%.

The % particle in the capsule is defined as:

weight of the polyiodide particle/weight of the suspending medium×100

It is to be understood that increasing the weight of the polyiodide particles within the capsule will lead to darker (low % T in the off-state) SPD films and conversely decreasing the weight of the polyiodide particle within the capsule will lead to lighter (high % T in the off-state) SPD films.

The matrix/capsule ratio is defined as:

Weight of matrix polymer/(weight of polyioide particle+weight of the suspending medium)

It is also to be understood that increasing the weight of the matrix polymer within the emulsion will lead to lighter (high % T in the off-state) SPD films and conversely decreasing the weight of the matrix polymer will lead to darker (low % T in the off-state) SPD films.

Based on the above, a single useful number is obtained by dividing the matrix/capsule ratio by the % particle in the capsule to obtain the Phase Ratio: % particle number for each film in Table 1. For example, an SPD film formulation with an increased % particles in the capsule phase will lower the Phase Ratio: % particle number because the increased % particle in the capsule number is in the denominator. If the same SPD film formulation also uses less matrix polymer it will also result in a lower Phase Ratio: % particle number because the value for the matrix/capsule ratio is in the numerator. Therefore, an SPD film formulation made by increasing the % particles in the capsule and decreasing the amount of matrix polymer relative to the capsule phase will yield a dark (low off-state % T) SPD film that will be represented by low Phase Ratio: % particle number. On the other hand, an SPD film made by decreasing the % particles in the capsule phase and increasing the amount of matrix polymer will yield lighter (high off-state % T) SPD film. In this case, a high value for the matrix/capsule in the numerator and a low value for the % particles in the denominator will be represented by a high value for the Ratio/% particle.

The following table includes non-limiting examples of SPD emulsion formulations to achieve SPD films with dark off-state transmittances (<0.5% T) and other SPD films with very clear on-state transmittances (>70% T). The table also includes other examples where the transmittance requirements of the invention were not met for illustrative and comparative purposes.

All of the examples in the table were prepared in the same manner. 0.3% Irgacure 819 photoinitiator was dissolved in the matrix polymer prior to mixing said matrix polymer with the capsule phase to form the SPD emulsion. A 4-mil thick layer of SPD emulsion was sandwiched between two, 7-mil thick ITO-PET substrates and identical UV irradiation conditions were employed to cure the samples.

found that the significant reduction in amount of matrix polymer in the emulsion caused the resulting film to take on a paste-like consistency rather than the solid film-like character of the films of the standard formulation. While not wishing to be bound by this theory, we believe that reducing the amount of the matrix polymer continuous phase that is UV-crosslinked to form the solid SPD film caused some areas of the coated emulsion to become phase reversed wherein the capsule phase became the continuous phase and the matrix phase became the capsule phase. Since the capsule phase is not designed to crosslink to a solid film, the integrity of the SPD film is compromised when the capsule phase reverses to the continuous phase. Film #10 had a very low off-state transmittance of 0.1, but the on-state transmittance was only 29.18.

While not wishing to be bound by the theory, we believe that the dramatic increase in particles in the capsules of Film #10 led to decrease in available space within the capsule that hindered the particles from fully aligning when the voltage was applied.

Film #13, with a combination of increasing the % of particles in the capsule from 6.83 for the standard formulation to 7.97 and decreasing the ratio of the amount of matrix polymer to the amount of capsule components (particles and liquid suspending medium) from 1.5 for the standard formulation to 1.25, yielded an off-state transmittance of 0.38 and an on-state transmittance of 43.23 for a ΔT of 42.85. This dark SPD film did not exhibit phase reversal of the capsule phase and had a good range of light transmission.

Film #12's formulation maintained the % particles in the capsule at 6.83 but reduced the matrix/capsule ratio from the standard 1.5 to 1.17. This resulted in an off-state transmittance of 0.35 and an on-state transmittance of 46.04 for a ΔT of 45.69.

Based on these results and the corresponding Phase Ratio: % particle numbers in Table 1 it has been determined that a Phase Ratio: % particle number >0.157 and <0.220 is preferred to obtain a dark SPD film in the unpowered Off state (<0.5% T) with a ΔT >42%.

TABLE 1

| Film # | % particles in capsule | Matrix/capsule ratio | Phase Ratio: % particle | off-state Transmittance | on-state Transmittance | ΔT |
| --- | --- | --- | --- | --- | --- | --- |
| std. | 6.83 | 1.5 | 0.220 | 1.33 | 49.47 | 48.14 |
| 1 | 6.71 | 6.42 | 0.957 | 10.03 | 71.67 | 61.64 |
| 2 | 3.09 | 3.7 | 1.197 | 17.7 | 74.77 | 57.07 |
| 3 | 1.87 | 1.5 | 0.802 | 8.08 | 65.55 | 57.47 |
| 4 | 5.13 | 2.71 | 0.528 | 4.49 | 62.31 | 57.82 |
| 5 | 3.4 | 2.8 | 0.824 | 10.65 | 71.21 | 60.56 |
| 5A | 3.43 | 2.79 | 0.813 | 10.83 | 72.64 | 61.81 |
| 6 | 3.43 | 4 | 1.166 | 18.62 | 74.36 | 55.74 |
| 7 | 3.24 | 1.56 | 0.481 | 2.11 | 52.22 | 50.11 |
| 8 | 3.12 | 3.7 | 1.186 | 17.7 | 57.06 | 39.36 |
| 9 | 0.015 | 1.5 | 100.000 | 21.04 | 71.2 | 50.16 |
| 10 | 10.25 | 1.5 | 0.146 | 0.1 | 29.18 | 29.08 |
| 11 | 7.2 | 1 | 0.139 | 0.27 | 47.02 | 46.75 |
| 12 | 6.83 | 1.17 | 0.171 | 0.35 | 46.04 | 45.69 |
| 13 | 7.97 | 1.25 | 0.157 | 0.38 | 43.23 | 42.85 |

Analyzing the darker, lower transmittance SPD films in the off-state, Film #11 with an off-state transmittance of 0.27, on-state transmittance of 47.02 demonstrated both a sufficiently dark SPD film and a high ΔT (46.75). This good result was accomplished by a combination of increasing the % of particles in the capsule from 6.83 for the standard formulation to 7.2 and decreasing the ratio of the amount of matrix polymer to the amount of capsule components (particles and liquid suspending medium) from 1.5 for the standard formulation (see std. in Table 1) to 1. However, it was subsequently Turning to the SPD films with high on-state transmittances, Film #9 with a combination of significantly decreasing the % of particles in the capsule from 6.83 for the standard formulation to 0.015 and maintaining the ratio of the amount of matrix polymer to the amount of capsule components (particles and liquid suspending medium) at the standard 1.5, yielded an off-state transmittance of 21.04 and an on-state transmittance of 71.2 for a ΔT of 50.16. Although the on-state transmittance and ΔT are excellent results the relatively high off-state transmittance of 21.04 would probably be too light for many applications.

Alternatively, Film #1 with a combination of maintaining the standard % of particles in the capsule at about 6.83 (actual 6.71) and significantly increasing the ratio of the amount of matrix polymer to the amount of capsule components (particles and liquid suspending medium) from the standard 1.5 to 6.42, yielded an off-state transmittance of 10.03 and an on-state transmittance of 71.67 for a ΔT of 61.64. This result was preferred over the results for Film #9 because a significantly lower off-state transmittance was achieved while, at the same time, an on-state transmittance >70% and a ΔT >60 was also attained.

A similar result to Film #1 was obtained with duplicate Films #5 and #5A. In the case of #5A, a combination of decreasing the % of particles in the capsule from a standard of 6.83 to 3.43 and increasing the ratio of the amount of matrix polymer to the amount of capsule components (particles and liquid suspending medium) from the standard 1.5 to 2.79, yielded an off-state transmittance of 10.83 and an on-state transmittance of 72.64 for a ΔT of 61.81.

Based on these results and the corresponding Phase Ratio: % particle numbers in Table 1 it has been determined that a Phase Ratio: % particle number >0.802 and <1.197 is preferred to obtain a light SPD film in the powered On state (>70% T) with a ΔT >57%.

In another embodiment, as an alternative to stacking two SPD light valves to achieve a darker SPD off-state, an SPD light valve can be constructed wherein three sheets of PET with ITO coatings and two layers of cured SPD emulsion are combined to form a novel SPD light valve construction. The construction would have nine layers, namely, from one side to the other: (1) a first sheet of polyethylene terephthalate ("PET") plastic, preferably but not necessarily 5-7 mils in thickness, (2) a very thin transparent, electrically conductive coating of indium tin oxide ("ITO"), acting or capable of acting as an electrode, on said first sheet of PET, (3) a layer of cured (i.e., cross-linked) SPD emulsion, preferably but not necessarily 2-5 mils in thickness, (4) a second ITO coating acting or capable of acting as an electrode on (5) a second PET plastic substrate, (6) a third ITO coating acting or capable of acting as an electrode on the opposite side of said second PET plastic substrate, (7) a second layer of cured (i.e., cross-linked) SPD emulsion, preferably but not necessarily 2-5 mils in thickness, (8) a fourth ITO coating acting or capable of acting as an electrode on (9) a third sheet of polyethylene terephthalate ("PET") plastic, preferably but not necessarily 5-7 mils in thickness.

The latter construction would yield a darker SPD light valve without requiring the high voltage necessary to power a single thicker layer of cured SPD emulsion. It would also yield a monolithic SPD light valve that would eliminate one sheet of PET with ITO coating. In addition, this embodiment would maintain the requirement of only two sheets of interlayer for the subsequent lamination of the SPD light valve between glass or plastic substrates.

This embodiment would also allow for wiring of the electrodes to a power supply whereby each of the two layers of cured SPD emulsion could be powered separately or both of said layers could be powered simultaneously. The two layers of SPD emulsion could also have different coating thicknesses to further enhance the variability/range of the monolithic SPD light valve's optical transmittance.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A light valve film forming a light modulating element of a light valve, said film comprised of a cross-linked matrix polymer with a plurality of droplets of a liquid light valve suspension distributed therein, said film having a phase ratio: % particle number value >0.157 and <0.220, wherein the phase ratio: % particle number value is calculated using the following formula $$\frac{\text{Matrix/capsule ratio}}{\text{\% particles in the capsule}} = \text{Phase ratio: \% particle number}$$

and wherein the light valve film has a relatively low visible transmittance in the unpowered Off state such that the film has a % T of <0.05 and a ΔT of >42%.

2. The light valve film of claim 1, further comprising, applied upon said film, at least one layer selected from among a film, a coating and a sheet, wherein the at least one layer provides to said film at least one selected from the group consisting of scratch resistance, protection from ultraviolet radiation, reflection from of infrared energy, electrical conductivity for transmitting an applied electric or magnetic field to the light valve field, insulation protection from short circuits, color tinting and acoustic control.

3. An electro-optical device for controlling the transmission of radiation, said device having two opposed sides and comprising, from one side to the other:
   (a) a first sheet of polyethylene terephthalate (PET) plastic;
   (b) a first thin, transparent electrically conductive coating that acts, or is capable of acting as an electrode, on the first sheet of PET:
   (c) a first light valve film according to claim 1;
   (d) a second thin, transparent electrically conductive coating acting or capable of acting as an electrode, said second coating applied upon an outer surface of,
   (e) a second sheet of polyethylene terephthalate plastic;
   (f) a third thin, transparent electrically conductive coating acting or capable of acting as an electrode, said third coating applied upon an inner surface of said second sheet of polyethylene terephthalate plastic,
   (g) a second light valve film according to claim 1;
   (h) a fourth thin, transparent electrically conductive coating acting or capable of acting as an electrode, said fourth coating applied upon an inner surface of,
   (i) a third sheet of polyethylene terephthalate (PET) plastic.

4. An electro-optical device for controlling the transmission of radiation, said device having two opposed sides and comprising, from one side to the other:
   (a) a first sheet of polyethylene terephthalate (PET) plastic;
   (b) a first thin, transparent electrically conductive coating that acts, or is capable of acting as an electrode, on the first sheet of PET:
   (c) a first light valve film according to claim 1;
   (d) a second thin, transparent electrically conductive coating acting or capable of acting as an electrode, said second coating applied upon an outer surface of,
   (e) a second sheet of polyethylene terephthalate plastic;
   (f) a third thin, transparent electrically conductive coating acting or capable of acting as an electrode, said third coating applied upon an inner surface of said second sheet of polyethylene terephthalate plastic, (g) a second light valve film comprised of a cross-linked matrix polymer with a plurality of droplets of a liquid light valve suspension distributed therein, said film having a phase ratio: % particle number value >0.802 and <1.197, wherein the phase ratio: % particle number value is calculated using the following formula Matrix/capsule ratio=Phase ratio: % particle number
% particles in the capsule and wherein the light valve film has a relatively high visible transmittance in the On state such that the film has a % T of >70% and a $\Delta T$ of >57%;

(h) a fourth thin, transparent electrically conductive coating acting or capable of acting as an electrode, said fourth coating applied upon an inner surface of, (i) a third sheet of polyethylene terephthalate (PET) plastic.

5. An electro-optical device for controlling the transmission of radiation, said device having two opposed sides and comprising, from one side to the other:

(a) a first sheet of polyethylene terephthalate (PET) plastic;

(b) a first thin, transparent electrically conductive coating that acts, or is capable of acting as an electrode, on the first sheet of PET:

(c) a first light valve film comprised of a cross-linked matrix polymer with a plurality of droplets of a liquid light valve suspension distributed therein, said film having a phase ratio: % particle number value >0.802 and <1.197, wherein the phase ratio: % particle number value is calculated using the following formula Matrix/capsule ratio=Phase ratio: % particle number
% particles in the capsule and wherein the light valve film has a relatively high visible transmittance in the On state such that the film has a % T of >70% and a $\Delta T$ of >57%;

(d) a second thin, transparent electrically conductive coating acting or capable of acting as an electrode, said second coating applied upon an outer surface of, (e) a second sheet of polyethylene terephthalate plastic;

(f) a third thin, transparent electrically conductive coating acting or capable of acting as an electrode, said third coating applied upon an inner surface of said second sheet of polyethylene terephthalate plastic, (g) a second light valve according to claim 1;

(h) a fourth thin, transparent electrically conductive coating acting or capable of acting as an electrode, said fourth coating applied upon an inner surface of, (i) a third sheet of polyethylene terephthalate (PET) plastic.

6. A light valve film forming a light modulating element of a light valve, said film comprised of a cross-linked matrix polymer with a plurality of droplets of a liquid light valve suspension distributed therein, said film having a phase ratio: % particle number value >0.802 and <1.197, wherein the phase ratio: % particle number value is calculated using the following formula $$\frac{\text{Matrix/capsule ratio}}{\text{\% particles in the capsule}} = \text{Phase ratio: \% particle number}$$

and wherein the light valve film has a relatively high visible transmittance in the On state such that the film has a % T of >70% and a $\Delta T$ of >57%.

7. The light valve film of claim 6, further comprising, applied upon said film, at least one layer selected from among a film, a coating and a sheet, wherein the at least one layer provides to said film at least one selected from the group consisting of scratch resistance, protection from ultraviolet radiation, reflection of infrared energy, electrical conductivity for transmitting an applied electric or magnetic field, insulation protection from short circuits, color tinting and acoustic control.

8. An electro-optical device for controlling the transmission of radiation, said device having two opposed sides and comprising, from one side to the other:

(a) a first sheet of polyethylene terephthalate (PET) plastic;

(b) a first thin, transparent electrically conductive coating that acts, or is capable of acting as an electrode, on the first sheet of PET:

(c) a first light valve film according to claim 6;

(d) a second thin, transparent electrically conductive coating acting or capable of acting as an electrode, said second coating applied upon an outer surface of, (e) a second sheet of polyethylene terephthalate plastic;

(f) a third thin, transparent electrically conductive coating acting or capable of acting as an electrode, said third coating applied upon an inner surface of said second sheet of polyethylene terephthalate plastic, (g) a second light valve film according to claim 6;

(h) a fourth thin, transparent electrically conductive coating acting or capable of acting as an electrode, said fourth coating applied upon an inner surface of, (i) a third sheet of polyethylene terephthalate (PET) plastic.

* * * * *

UNITED STATES PATENT AND TRADEMARK OFFICE
CERTIFICATE OF CORRECTION

PATENT NO. : 8,922,872 B2  
APPLICATION NO. : 13/761577  
DATED : December 30, 2014  
INVENTOR(S) : Chen et al.

Page 1 of 1

It is certified that error appears in the above-identified patent and that said Letters Patent is hereby corrected as shown below:

On the Title page item (57),

In the Abstract, on line 9, "%T of < 0.05" should read -- %T of < 0.5 --

In the Specification,

At column 5, line 51, "%T of < 0.05" should read -- %T of < 0.5 --

In the Claims,

Column 10, line 21, "%T of < 0.05" should read -- %T of < 0.5 --

Signed and Sealed this  
Seventh Day of July, 2015

Michelle K. Lee  
*Director of the United States Patent and Trademark Office*